US012580181B2

(12) United States Patent
Zhou et al.

(10) Patent No.: US 12,580,181 B2
(45) Date of Patent: Mar. 17, 2026

(54) COMPOSITE BATTERY ELECTRODE STRUCTURES COMPRISING HIGH-CAPACITY MATERIALS AND POLYMERS AND METHODS OF FORMING THEREOF

(71) Applicant: Gru Energy Lab Inc., San Jose, CA (US)

(72) Inventors: Sa Zhou, Fremont, CA (US); Song Han, Foster City, CA (US); Xiahui Yao, San Jose, CA (US)

(73) Assignee: GRU Energy Lab Inc., San Jose, CA (US)

( * ) Notice: Subject to any disclaimer, the term of this patent is extended or adjusted under 35 U.S.C. 154(b) by 886 days.

(21) Appl. No.: 17/660,909

(22) Filed: Apr. 27, 2022

(65) Prior Publication Data

US 2022/0344641 A1      Oct. 27, 2022

Related U.S. Application Data

(60) Provisional application No. 63/180,229, filed on Apr. 27, 2021.

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0438* (2013.01); *H01M 4/0452* (2013.01); (Continued)

(58) Field of Classification Search
None
See application file for complete search history.

(56) References Cited

U.S. PATENT DOCUMENTS

2002/0110737 A1* 8/2002 Park ...................... H01M 4/485
252/182.1
2004/0126582 A1* 7/2004 Ng ........................ C09K 11/59
428/407
(Continued)

OTHER PUBLICATIONS

Tsuyuki et al., Analysis of Cathodic Reaction Process of SiCl4 during Si Electrodeposition in Ionic Liquids, J. Electrochem. Soc. 164, D994, 2017, DOI 10.1149/2.0761714jes (Year: 2017).*
(Continued)

*Primary Examiner* — Ula C Ruddock
*Assistant Examiner* — Anna Korovina
(74) *Attorney, Agent, or Firm* — Polygon IP, LLP

(57) ABSTRACT

Described herein are composite battery electrode structures and methods of forming such structures. Composite battery electrode structures comprise active electrode material structures and polymer structures such that at least a portion of the polymer structures at least partially protrudes into some of the high capacity structures. Some of these polymer structures may be fully enclosed by the active electrode material structures. Other polymer structures may only partially extend inside the active electrode material structures. Furthermore, additional polymer structures may be bound to the external surface of the active electrode material structures. Composite battery electrode structures may be formed using low-temperature deposition techniques, such as solvent-thermal synthesis, direct chemical reduction, and electrochemical deposition. More specifically, composite battery electrode structures may be formed from a solution comprising active electrode material precursors and polymer precursors, e.g., dissolved polymers, monomers, and/or conductive polymers electrically coupled to the working electrodes.

20 Claims, 7 Drawing Sheets

(51) Int. Cl.
  *H01M 4/04*     (2006.01)
  *H01M 4/38*     (2006.01)
  *H01M 4/60*     (2006.01)
  *H01M 4/62*     (2006.01)

(52) U.S. Cl.
  CPC ....... *H01M 4/0466* (2013.01); *H01M 4/0497*
      (2013.01); *H01M 4/38* (2013.01); *H01M*
      *4/386* (2013.01); *H01M 4/602* (2013.01);
      *H01M 4/622* (2013.01); *H01M 4/628*
      (2013.01); *H01M 2004/021* (2013.01)

(56)           References Cited

U.S. PATENT DOCUMENTS

| 2011/0165468 | A1* | 7/2011 | Alias | H01M 4/364 |
| | | | | 427/215 |
| 2012/0007028 | A1* | 1/2012 | Hwang | H01M 4/366 |
| | | | | 252/514 |
| 2014/0231724 | A1* | 8/2014 | Osaka | H01M 4/5825 |
| | | | | 252/516 |
| 2014/0370378 | A1* | 12/2014 | Liu | H01M 4/1395 |
| | | | | 427/213.36 |
| 2018/0351160 | A1* | 12/2018 | Jo | H01M 4/364 |

OTHER PUBLICATIONS

Nishimura et al., Electrochemical reduction of silicon chloride in a non-aqueous solvent, Electrochimica Acta, vol. 53, Issue 1, 2007, pp. 111-116, https://doi.org/10.1016/j.electacta.2007.06.026 (Year: 2007).*

Zhou et al., Solvothermal synthesis of a silicon hierarchical structure composed of 20 nm Si nanoparticles coated with carbon for high performance Li-ion battery anodes, Dalton Trans., 2016,45, 13667-13670, DOI: 10.1039/C6DT02551J (Year: 2016).*

Ma et al., In situ intercalative polymerization of pyrrole in graphene analogue of MoS2 as advanced electrode material in supercapacitor, Journal of Power Sources, vol. 229, May 1, 2013, pp. 72-78, https://doi.org/10.1016/j.jpowsour.2012.11.088) (Year: 2013).*

Chao Wang, et al., Self-healing chemistry enables the stable operation of silicon microparticle anodes for high-energy lithium-ion batteries, Nature Chemistry published Nov. 17, 2013, DOI: 10.1038/ NCHEM.1802, 7 pages.

Christoph Erk, et al., Toward Silicon Anodes for Next-Generation Lithium Ion Batteries: A Comparative Performance Study of Variou Polymer Binders and Silicon Nanopowders, ACS Applied Materials & Interfaces, www.acsami.org, dx.doi.org/10.1021/am401642c | ACS Appl. Mater. Interfaces 2013, 5, 7299-7307. 9 pages.

Hui Wu, et al., Nature Communications | 4:1943 | DOI: 10.1038/ ncomms2941, www.nature.com/naturecommunications, 1 & 2013 Macmillan Publishers Limited. 6 pages.

Jake Entwistle, et al., A review of magnesiothermic reduction of silica to porous silicon for lithium-ion battery applications and beyond, The Royal Society of Chemistry 2018, J. Mater. Chem. A, 2018, 6, 18344-18356, 14 pages.

Jianbang Ge, et al., Electrochemical Production of Si without Generation of CO2 Based onthe Use of a Dimensionally Stable Anode in Molten CaCl2. Published 2019 Wiley-VCH Verlag GmbH & Co. KGaA, Weinheim Angew. Wiley Online Library Chem. 2019, 131, 2-8, DOI: 10.1002/anie.201905991. 7 pages.

Lorenzo Mangolini, Synthesis, properties, and applications of Silicon Nanocrystals, J. Vac. Sci. Technol. B 31, 020801 (2013); doi: 10.1116/1.4794789. 30 pages. http://dx.doi.org/10.1116/1.4794789.

Magali Gauthier, et al., A low-cost and high performance ball-milled Si-basednegative electrode for high-energy Li-ion batteries, Energy Environ. Sci., 2013, 6, 2145-2155. 12 pages.

Mingyan Wu, et al., Toward an ideal polymer binder design for high-capacity battery anodes. Lawrence Berkeley National Laboratory, Journal of the American Chemical Society, 135(32), Published Aug. 1, 2013, DOI 10.1021/ja4054465. 24 pages.

Sunghun Choi et al., Highly elastic binders integrating polyrotaxanes for silicon microparticle anodes in lithium ion batteries, Science 357, 279-283 (2017) Jul. 21, 2017, 5 pages.

\* cited by examiner

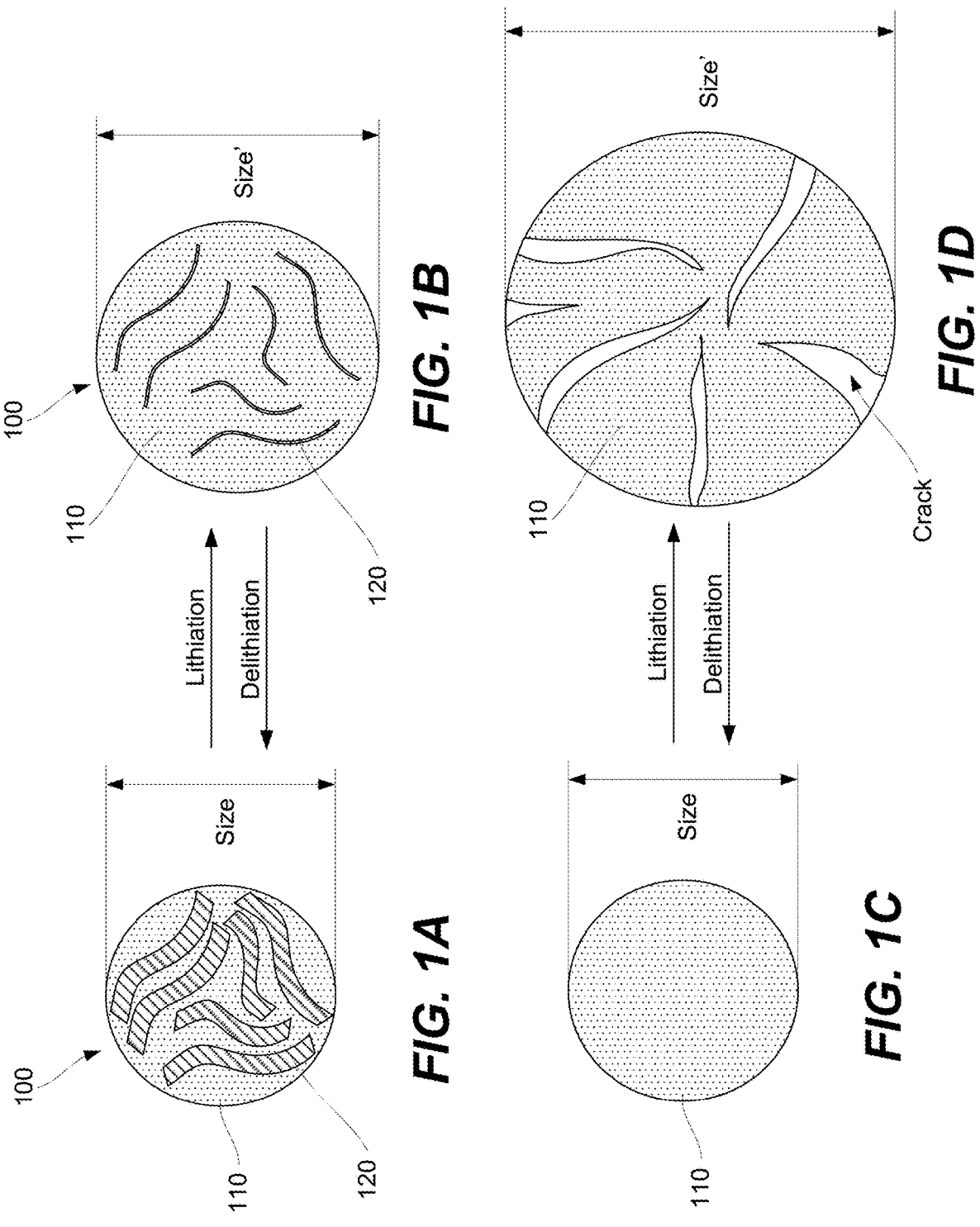

COMPOSITE BATTERY ELECTRODE STRUCTURES COMPRISING HIGH-CAPACITY MATERIALS AND POLYMERS AND METHODS OF FORMING THEREOF

CROSS-REFERENCE TO RELATED APPLICATIONS

This application claims the benefit under 35 U.S.C. § 119(e) of U.S. Provisional Patent Application 63/180,229, filed on 2021 Apr. 27, which is incorporated herein by reference in its entirety for all purposes.

BACKGROUND

High-capacity materials, such as silicon, are highly desirable for various battery applications due to their high gravimetric and volumetric capacities. However, many high-capacity materials undergo significant volume changes during charge-discharge cycling (e.g., incorporation-removal of lithium ions into these materials). The repeated cycling and the corresponding volume changes can pulverize the structures formed from these high-capacity materials. The pulverization can results in high irreversible capacity losses, excessive solid-electrolyte-interface (SEI) formation, and losses of electrical contacts within electrodes formed from these materials, all of which are highly undesirable. These issues have greatly limited the application of high-capacity active materials in batteries. As such, graphite remains the most common choice among negative electrode active materials in lithium-ion battery cells despite having a theoretical capacity of only 372 mAh/g.

Different solutions have been proposed to address these volume-change issues. For example, reducing the size of active material structures helps with reducing the stress within these structures during the volume changes and, as a result, improves their intrinsic mechanical stability. However, supporting and interconnecting many small individual structures presents their own challenges. Another solution involves incorporating active electrode material structures into rigid support matrices, which mechanically limit the expansion of these structures. However, these support matrices add to the total electrode weight and can be challenging to form. Yet another solution involves mixing active electrode material structures with specific polymer binders (e.g., highly flexible binders) that support these structures during the volume changes and, to a certain extent, after the pulverization. However, all these solutions have had very limited success due to the extreme nature of volume changes (e.g., up to 400% and even more in the case of silicon).

What is needed are new batter electrode structures comprising high capacity materials such that these structures can support repeated charge and discharge of the high capacity materials while maintaining their integrity and supporting the battery performance over multiple charge-discharge cycles.

SUMMARY

Described herein are composite battery electrode structures and methods of forming such structures. Composite battery electrode structures comprise active electrode material structures and polymer structures such that at least a portion of the polymer structures at least partially protrudes into some of the high capacity structures. Some of these polymer structures may be fully enclosed by the active electrode material structures. Other polymer structures may only partially extend inside the active electrode material structures. Furthermore, additional polymer structures may be bound to the external surface of the active electrode material structures. Composite battery electrode structures may be formed using low-temperature deposition techniques, such as solvent-thermal synthesis, direct chemical reduction, and electrochemical deposition. More specifically, composite battery electrode structures may be formed from a solution comprising active electrode material precursors and polymer precursors, e.g., dissolved polymers, monomers, and/or conductive polymers electrically coupled to the working electrodes.

In some examples, composite battery electrode structures, for use in a battery cell, comprise active electrode material structures with the reversible gravimetric capacity more than 100 mAh/g in the range of 0 V to 5 V vs. lithium and polymer structures, which contain repeating molecular units at least in one dimension. At least a first portion of the polymer structures at least partially protrudes into and is at least partially surrounded by at least a second portion of the active electrode material structures.

In some examples, the active electrode material structures comprise at least one of silicon (Si), germanium (Ge), tin (Sn), aluminum (Al), silicon oxide ($SiO_x$), silicon carbide (SiC), and silicon oxycarbide ($SiO_xC_y$). In the same or other examples, at least a sub-portion of the first portion of the polymer structures are fully enclosed by the active electrode material structures. In some examples, the composite battery electrode structures have a mean particle size of less than 100 micrometers.

In some examples, the polymer structures comprise one or more of poly(acrylic acid) (PAA), polyvinylalcohol (PVA), polyvinylidene difluoride (PVDF), carboxymethyl cellulose (CMC), polyacrylonitrile (PAN), polyaniline (PANI), polypyrrole (PPy), and pyrene-polyacrylic acid (PR-PAA). In the same or other examples, the polymer structures comprise one or more conductive polymers. In some examples, the polymer material comprises at least one of 2,5-Dibromo-3, 4-ethylenedioxythiophene polymer, 2,5-Dichloro-3,4-ethylenedioxythiophene polymer, aniline polymer, acrylonitrile polymer, styrene polymer, ethylene oxide polymer, butadiene polymer, pyrrole polymer, and glucose polymer.

Also provided is a method of fabricating composite battery electrode structures. In some examples, the method comprises synthesizing active electrode material structures using one or more low-temperature techniques selected from the group consisting of electrochemical deposition, solvent-thermal synthesis, and direct chemical reduction. The composite battery electrode structures comprise active electrode material structures and polymer structures. At least a first portion of the polymer structures is at least partially incorporated into a second portion of the active electrode material structures while synthesizing the active electrode material structures such that at least the first portion of the polymer structures partially protrudes into and is at least partially surrounded by at least a second portion of the active electrode material structures.

In some examples, the method further comprises forming the polymer structures simultaneously with electrochemically depositing the active electrode material structures. For example, forming the polymer structures comprises adsorbing a polymer material on the active electrode material structures while the active electrode material structures are being electrochemically deposited. More specifically, the polymer material can be dissolved in a solution comprising one or more components used for electrochemically depositing the active electrode material structures. In some examples, the polymer material comprises at least one of poly(acrylic acid) (PAA), polyvinylalcohol (PVA), polyvinylidene difluoride (PVDF), carboxymethyl cellulose (CMC), polyacrylonitrile (PAN), polypyrrole (PPy), or pyrene-polyacrylic acid (PR-PAA).

In some examples, forming the polymer structures comprises polymerizing a monomer material while synthesizing the active electrode material structures. For example, the monomer material comprises at least one of 2,5-dibromo-3,4-ethylenedioxythiophene monomer, 2,5-dichloro-3,4-ethylenedioxythiophene monomer, aniline monomer, acrylonitrile monomer, styrene monomer, ethylene oxide monomer, butadiene monomer, pyrrole monomer, and glucose monomer. In some examples, the monomer material comprises at least one of polyacrylic acid (PAA) monomer, vinyl acetate monomer, and methyl methacrylate monomer.

In some examples, the polymer structures comprise a conductive polymer and are mechanical and electrically coupled to a working electrode used for electrochemically depositing the active electrode material structures such that the active electrode material structures electrochemically deposit on the surface of the polymer structures. For example, the conductive polymer comprises one or more of polyaniline (PANI), polypyrrole (PPy), and poly(3,4-ethylenedioxythiophene) polystyrene sulfonate (PEDOT:PSS). In some examples, the active electrode material structures comprise silicon and wherein an electrodeposition solution comprises one or more silicon tetrachloride ($SiCl_4$), silicon tetrabromide ($SiBr_4$), silicon tetraiodide ($SiI_4$), trichlorosilane ($HSiCl_3$), dichlorosilane ($H_2SiCl_2$), tetraethyl orthosilicate ($Si(OC_2H_5)_4$), methyltrichlorosilane ($CH_3SiCl_3$), germanium tetrachloride ($GeCl_4$), and tin tetrachloride ($SnCl_4$).

In some examples, the composite battery electrode structures have a mean particle size of between 5 nanometers and 100 micrometers. In the same or other examples, the method further comprises, simultaneously with synthesizing the active electrode material structures, forming the polymer structures.

BRIEF DESCRIPTION OF THE DRAWINGS

FIGS. 1A and 1B are schematic illustrations of a composite battery electrode structure at different lithiation stages, in accordance with some examples.

FIGS. 1C and 1D are schematic illustrations of an active electrode material structure, which is free from any polymer structures, at different lithiation stages, in accordance with some examples.

DETAILED DESCRIPTION

Figure 1E:
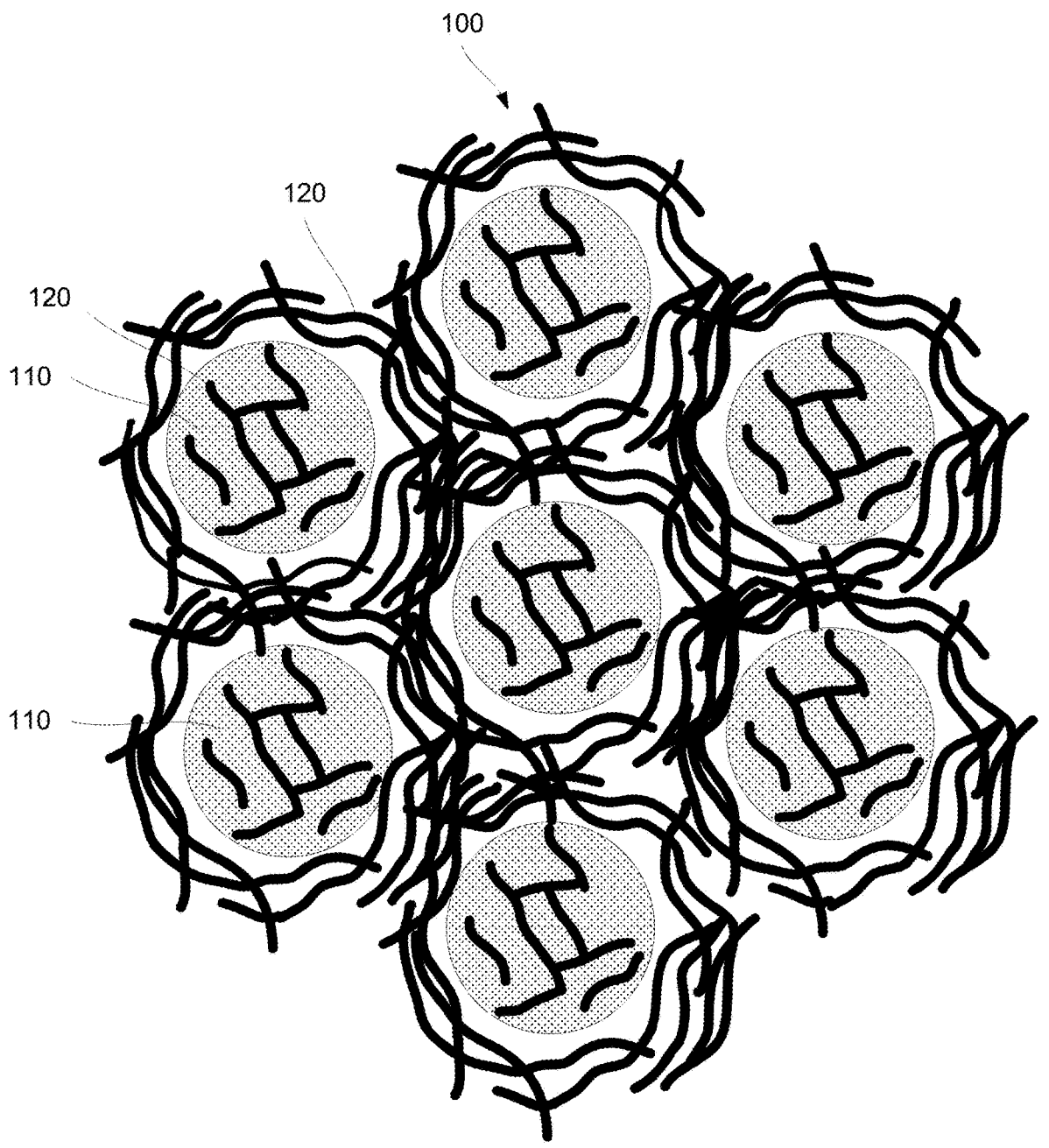
FIG. 1E is a schematic illustration of composite battery electrode structures comprising active electrode material structures and polymer structures such that at least a portion of the polymer structures at least partially protrudes into some of the high capacity structures, in accordance with some examples.

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

Introduction

Incorporating polymer structures into active electrode material structures (e.g., high-capacity active material structures) or, more specifically, inside these structures produces composite battery electrode structures. These composite battery electrode structures have various benefits over other types of electrode structures and other solutions, specifically addressing some aspects of the volumetric changes associated with high-capacity materials. For example, as noted above, standalone structures, formed from high-capacity active materials (without polymer structures), experience large volume changes when lithium (or other like materials) are introduced or removed from these structures during battery cycling. These large volume changes can break electrical and/or mechanical connections among these standalone structures and also between these structures and other electrode components (e.g., current collector substrates, polymer binder) resulting in poor cycle life.

Composite battery electrode structures are formed in such a way that at least a portion of the polymer structures (e.g., a first portion) at least partially protrudes into/inside some (e.g., a second portion) of the active electrode material structures. In other words, the first portion of the polymer structures is at least partially enclosed and encapsulated by at least the second portion of the active electrode material structures. The remaining portion (e.g., a third portion) of the polymer structures may extend outside of the active electrode material structures and, for example, bind to other components in the electrode layers (e.g., other active electrode material structures, other polymer structures, polymer binders, conductive additives, current collectors, and the like). In some examples, the same polymer structure may extend inside multiple active electrode material structures. In the same or other examples, at least some of these polymer structures may be fully enclosed by the active electrode material structures. Alternatively, all of the polymer structures are enclosed and encapsulated by at least the second portion of the active electrode material structures such that the polymer structures do not protrude beyond the active electrode material structures. Furthermore, in some examples, at least some polymer structures may be positioned in between active electrode material structures without protruding into any active electrode material structures.

In the same or other examples, at least some active electrode material structures may not have any polymer structures protruding into these active electrode material structures. For example, polymer structures may be bound to the surfaces of the active electrode material structures and/or to other polymer structures. Overall, composite battery electrode structures may be also referred to as polymer-in-particle structures.

The polymer structures, being at least partially inside the high capacity structures, provide the internal elastic adhesion and support the overall composite battery electrode structures from being torn apart (e.g., during the volume changes associated with lithiation of the high capacity structures). As such, the overall composite battery electrode structures and, more specifically, the high capacity structures within these composite battery electrode structures remain substantially intact during cycling (e.g., after repeated lithiation/delithiation). Furthermore, the polymer structures offer some buffer space to accommodate the volume expansion of the active electrode material structures during their lithiation. For example, polymer structures can be compressible and/or porous. As a result, the overall volume change of composite battery electrode structures is not as severe as for standalone high-capacity active material structures. Furthermore, high-capacity active material structures can expand in more directions within these composite structures. This volume change difference is schematically shown in FIGS. 1A-1D. Specifically, FIG. 1A is a schematic illustration of composite battery electrode structure 100, comprising high-capacity structure 110 and polymer structures 120 before lithiation. In this example, polymer structures 120 are embedded within high-capacity structure 110 and occupy a substantial volume in the overall composite battery electrode structure 100. FIG. 1B is a schematic illustration of the same composite battery electrode structure 100 after lithiation. High-capacity structure 110 increases in volume due to the addition of lithium. However, some of this volume increase is accommodated by polymer structures 120, e.g., experiencing some decrease in volume. As such, the overall size increase of composite battery electrode structure 100 is not as significant and, in some examples, can be maintained below the pulverization threshold associated with the active material of high-capacity structure 110. Furthermore, polymer structures 120 provide internal support to different parts of high-capacity structure 110, e.g., preventing irreversible separation between these parts. Finally, polymer structures 120 can assist with electronic and/or ionic conductivity within composite battery electrode structure 100 and, when polymer structures 120 extends outside the boundaries of high-capacity structure 110, with external structures (e.g., other composite battery electrode structures and/or current collectors).

FIG. 1C is a schematic illustration of high-capacity structure 110 before lithiation and free from polymer structures. FIG. 1D is a schematic illustration of the same high-capacity structure 110 after lithiation. Since there are no polymer structures to accommodate the volume increase of high-capacity structure 110, the overall size increase is a lot more significant (e.g., up to 400% in the case of silicon). Furthermore, because of this greater volume increase and also because of the lack of internal support, high-capacity structure 110 tends to generate cracks and pulverize.

Overall and without being restricted to any particular theory, polymer structures are believed to act as mechanical buffers when high-capacity active material structures experience volume changes. Furthermore, polymer structures provide internal adhesive support to active electrode material structures during these volume changes. In some examples, polymer structures also provide external support by partially or fully extending outside of active electrode material structures. Finally, polymer structures can be operable as electronic and/or ionic conductors within composite battery electrode structures and/or outside these composite structures.

In some examples, methods of forming composite battery electrode structures involve a bottom-up synthesis where polymer structures are incorporated into active electrode material structures while depositing the active electrode material structures. This approach allows the integration of polymer structures at least partially inside some of the active electrode material structures. It should be noted that some active electrode material structures can be formed without polymer structures being embedded inside these structures. In some examples, active electrode material structures adhere to the polymer structures, e.g., through the surface contact.

Specifically, this in-situ integration synthesis involves simultaneous deposition of the high capacity structures and partial and/or full encapsulation of the polymer structures with the high capacity structures. For example, the high capacity structures are deposited around and/or on the surface of at least portions of the polymer structures or, in some examples, over the entire polymer structures. This bottom-up synthesis approach ensures the controlled size of high capacity structures, controlled distribution of the polymer structures in the high capacity structures, and other aspects further described below all of which provide cumulative benefit when cycling battery cells with battery electrode structures. For example, the polymer structures may have uniform distribution within the overall composite battery electrode structures (e.g., within the high capacity structures and/or outside of the high capacity structures). This uniform distribution may be extended down to the atomic scale, e.g., down to individual silicon atoms embedded into polymer matrices and/or a single molecular chain, e.g., one molecular chain of conductive polymer polyaniline, being surrounded by silicon structures.

These methods also provide a one-step synthesis from the precursors to the final composite battery electrode structures without a need for intermediate steps. This direct synthesis reduces and, in some examples, eliminates the chance of composite battery electrode structures being exposed to the ambient atmosphere thereby providing much higher process and environmental controls over the resulting composite structures. For example, many battery electrode materials are oxygen sensitive. As such, when these materials are exposed to air or any other oxygen-containing environment, these materials may react with oxygen and/or otherwise allow oxygen to get embedded into electrode structures. As a result, the oxygen content of electrode structures may become very high, especially when these structures are small, resulting in lower capacities and initial Coulombic efficiencies.

Furthermore, these methods allow solution-based low-temperature deposition (e.g., less than 100° C., less than 75° C., or even less than 50° C.), which is not possible with conventional deposition techniques (such as chemical vapor deposition). Solution-based deposition may be also referred to as liquid-solution-based deposition or simply liquid deposition (e.g., to differentiate from gas-based deposition techniques such as chemical vapor deposition. A low-temperature deposition helps with reducing the crystallinity of high-capacity materials, e.g., stimulates the formation of amorphous high-capacity materials. This can be characterized by the broadening effect of diffraction peaks from x-ray diffraction pattern. The domain size of these kind of material can be less than 10 nanometers, or even less than 1 nanometer, while the typical high temperature deposition yields domain size larger than 10 nanometers or even 100 nanometers. The solution-based approach provides high levels of processing control over various processing parameters, e.g., solution composition (e.g., type and concentration of precursors), solution temperature, electrode surface, electrode voltage, and the like.

Examples of Composite Battery Structures

FIG. 1E is a schematic illustration of composite battery electrode structures 100, in accordance with some examples. Composite battery electrode structures 100 comprise active electrode material structures 110 and polymer structures 120. At least a portion of polymer structures 120 at least partially protrudes into some active electrode material structures 110. For example, as schematically shown in FIG. 1E, some polymer structures 120 are fully enclosed by active electrode material structures 110. Other polymer structures 120 only partially protrude into active electrode material structures 110. Furthermore, additional polymer structures 120 may extend among active electrode material structures 110 without protruding into any of polymer structures 120.

Composite battery structure 100 may be in the form of particles (which may be referred to as 3-D structures), flakes, films (both of which may be referred to as 2-D structures), or rods, wires, and tubes (all of which may be referred to as 1-D structures). In some examples, active electrode material structures 110 comprise at least one of silicon (Si), germanium (Ge), tin (Sn), aluminum (Al), silicon oxide ($SiO_x$), silicon carbide (SiC), and silicon oxycarbide ($SiO_xC_y$). However, other high-capacity active materials are also within the scope. For purposes of this disclosure, high-capacity active materials are defined as any electrochemical active materials with a theoretical capacity of at least 400 mAh/g. For comparison, the theoretical capacity of graphite is only 372 mAh/g. Furthermore, high-capacity active materials may be categorized as alloy-type active materials (e.g., silicon, silicon monoxide, germanium) and conversion-type active materials (e.g., tin oxide, iron oxide, cobalt oxides, metal phosphides/sulfides/nitrides). In some other examples, composite battery structure 100 may comprise positive active materials such as $LiCoO_2$, $LiNi_aMn_bCo_cO_2$, $LiNi_aCo_bAl_cO_2$, $LiFe(PO_4)$, and $LiMnO_2$.

In some examples, the particle size of composite battery electrode structures 100 (e.g., active electrode material structures 110 with any fully or partially embedded polymer structures 120) is smaller than that of conventional electrode active materials. For example, the mean particle size of composite battery electrode structures 100 may be between 1 nanometer and 10 micrometers or, more specifically, between 5 nanometers and 500 nanometers or even between 10 nanometers and 200 nanometers. As a reference, conventional electrode active materials typically have a mean particle size of over 10 micrometers. Smaller particle sizes generate less stress (during the volume change cause the cycling), provide better packing density/take more advantage of the void spaces in the electrode slurry, and the like. Smaller particle sizes are particularly beneficial for high-capacity active materials. It should be noted that conventional methods of producing high-capacity active materials (e.g., gas-phase deposition) tend to generate much higher particle sizes.

In some examples, the mean particle size is up to 100 micrometers or, more specifically up to 50 micrometers. These larger particles may be secondary particles or primary particles. In some examples, the secondary particle having a size from 1 micrometer to 100 micrometers compromises many smaller primary particles, e.g., having a size from 1 nanometer to 10 micrometers and, e.g., bonded by the polymers. In other examples, one primary particle having a size from 1 micrometer to 100 micrometers may be a solitary particle with polymer incorporated inside.

In some examples, polymer structures 120 comprise one or more of poly(acrylic acid) (PAA), polyvinylalcohol (PVA), polyvinylidene difluoride (PVDF), carboxymethyl cellulose (CMC), polyacrylonitrile (PAN), polyaniline (PANI), polypyrrole (PPy), and pyrene-polyacrylic acid (PR-PAA). Furthermore, polymer structures 120 comprise one or more conductive polymers, such as polyaniline (PANI), polypyrrole (PPy), and poly(3,4-ethylenedioxythiophene) polystyrene sulfonate (PEDOT:PSS). In some examples, polymer structures 120 comprise one or more of 2,5-Dibromo-3,4-ethylenedioxythiophene polymer, 2,5-Dichloro-3,4-ethylenedioxythiophene polymer, aniline polymer, acrylonitrile polymer, styrene polymer, ethylene oxide polymer, butadiene polymer, pyrrole polymer, and glucose polymer.

In some examples, additional functionalities can be achieved by selecting specific polymers (e.g., PAA, PVDF, or PPy) for polymer structures 120, especially, the portion of polymer structures 120 extending inside active electrode material structures 110. Some examples of these additional functionalities include a higher conductivity (e.g., to reduce electric polarization to provide fast charging/discharging capability), an increased elasticity (e.g., to retain different parts of active electrode material structures during volumetric changes), a controlled SEO formation (e.g., using fluoride-containing polymers).

In some examples, the composition of active electrode material structures 110 is adjusted based on the precursor selection used during the deposition of the capacity structures. For example, active electrode material structures 110 can be single-component (e.g., formed from one electrode active material, such as Si, Ge, or Sn) or multi-component (e.g., in the form of an alloy, such as Si—Sn, $Fe_2Si$, $TiSi_2$, Ge—Si, or $Si_xO_yC_z$). The composition of active electrode material structures 110 is driven by battery applications, e.g., different cycling behavior, capacity, and efficiency. These and other properties depend, at least in part on the intrinsic material properties of active electrode material structures 110.

The ratio of active electrode material structures 110 and polymer structures 120 in composite battery electrode structures 100 may be tuned, e.g., for specific battery designs and applications. In some examples, the volume ratio of active electrode material structures 110 in composite battery electrode structures 100 is between 50% and 99% or, more specifically, between 60% and 99% or even between 75% and 99%. In the same or other examples, the volume ratio of polymer structures 120 in composite battery electrode structures 100 is between 1% and 50% or, more specifically, between 1% and 40% or even between 1% and 25%. The volume ratio can be examined by removing the polymer structure through solvent dissolution or high temperature oxidiation. The change of porosity before and after this removal represent the volume ratio of polymer structure 120 inside the active electrode material structures 110. In one example, the porosity was found to increase from 10% to 50% after this removal process, demonstrating 4:5 volume ratio between the polymer structure 120 and active material structure 110.

A portion of polymer structures 120 extending inside active electrode material structures 110 can be distributed substantially uniformly within active electrode material structures 110. In the same or other examples, another portion of polymer structures 120 extending outside active electrode material structures 110 can be distributed substantially uniformly within active electrode material structures 110.

Examples of Fabricating Composite Battery Electrode Structures

In general, composite battery electrode structures 100 can be fabricated by synthesizing active electrode material structures 110 using one or more low-temperature techniques, such as electrochemical deposition, solvent-thermal synthesis, and direct chemical reduction. It should be noted that conventional methods of forming active electrode material structures use high-temperature methods, such as chemical vapor deposition. For purposes of this disclosure, the term "low temperature" is defined as a temperature of less than 200° C. The term "high temperature" is defined as a temperature greater than 300° C. The low-temperature deposition allows the integration of polymer structures into high capacity structures while forming these high capacity structures. One having ordinary skill in the art would recognize that high temperatures are damaging to polymer structures (e.g., physically and/or chemically damaging). Furthermore, the low-temperature deposition of high capacity structures allows for achieving different morphology (e.g., crystallinity) or the resulting high capacity structures. In some examples, the active electrode material structures are amorphous or polycrystalline. For example, highly crystalline structures are less likely to incorporate polymer inside the particle and are more susceptible to pulverization. Additionally, the formation of a highly crystalline structure requires high temperature, which decomposes the polymer.

At least a portion of polymer structures 120 is at least partially incorporated into a portion of active electrode material structures 110 while synthesizing active electrode material structures 110 such that at least the first portion of polymer structures 120 partially protrudes into and is at least partially surrounded by at least a second portion of active electrode material structures 110. Specific examples of this synthesis will now be described in more detail with reference to FIG. 2.

Figure 2:
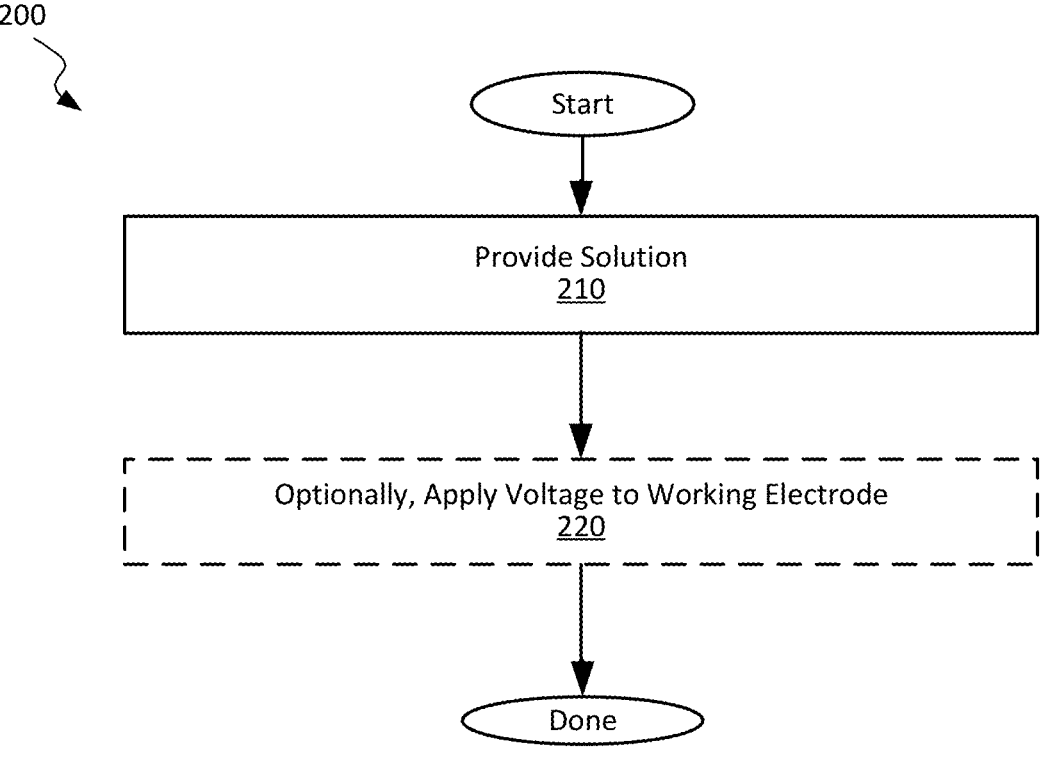
FIG. 2 is a process flowchart corresponding to a method of low-temperature deposition of composite battery electrode structures, which comprise active electrode material structures and polymer structures such that at least a portion of the polymer structures at least partially protrudes into some of the high capacity structures, in accordance with some examples.

FIG. 2 is a process flowchart corresponding to method 200 of fabricating composite battery electrode structures 100, in accordance with some examples. For example, method 200 may comprise providing (block 210) a solution (e.g., a liquid solution) comprising high-capacity material precursors and, in some examples, polymer precursors. Polymer precursors may be in the form of dissolved polymer materials, dissolved monomers (which are later polymerized), and/or conductive polymer structures supported on a working electrode. Each of these examples is further described below.

When active electrode material structures are formed using electrochemical deposition, method 200 involves applying (block 220) a voltage to a working electrode to drive the decomposition of the high-capacity material precursors and the deposition of active electrode material structures on the electrodes and/or polymer structures.

Examples of Continuous Surface Adsorption of Polymers

In some examples, a solution comprises high-capacity material precursors, which participated in an electrochemical or other reaction to form active electrode material structures. The solution also comprises polymer precursors in the form of dissolved polymer materials. These polymer materials do not participate in any chemical reactions but are continuously adsorbed on active electrode material structures forming polymer structures, while these active electrode material structures are being deposited. This simultaneous deposition and adsorption result in the polymer structures being at least partially integrated into the active electrode material structures. The deposition and adsorption processes may be independently controlled to ensure full integration (e.g., encapsulation) of the polymer structures into the active electrode material structures, partial integration, and/or no integration (e.g., some polymer structures are only bound to the surface of the active electrode material structures).

Figures 3A, 3B, 3C, 3D:
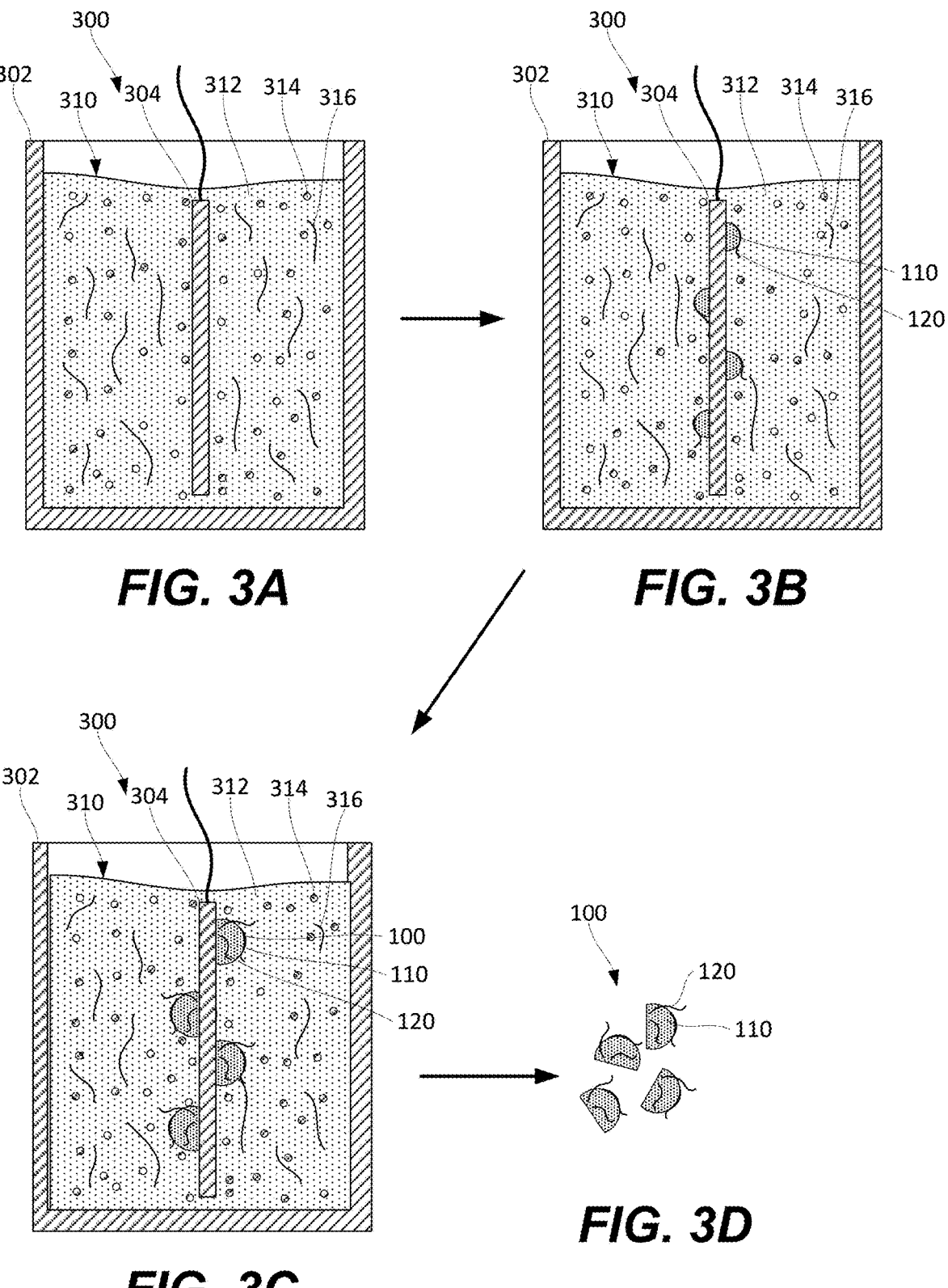
FIG. 3A-3D are schematic illustrations of different stages during low-temperature deposition of composite battery electrode structures, in accordance with some examples.

For example, active electrode material structures are electrochemically deposited in particle form. FIG. 3A illustrates an example of electrochemical deposition system 300 comprising electrochemical bath 302 and working electrode 304. One having ordinary skill in the art would understand that electrochemical deposition system 300 includes other components, which are not shown in a schematic illustration of FIG. 3A. For example, electrochemical deposition system 300 may comprise an electrical power source (connected to working electrode 304), a counter electrode, a reference electrode, a temperature-control module, and a solution agitation module.

Specifically, the working electrode, counter electrode, and reference electrode are submerged into electroplating solution 310. The power source applies the electrical potential between the working electrode and counter electrode, which results in the electrical current between these electrodes. This current is caused by ions flowing within electroplating solution 310 between the electrodes. For example, during the low-temperature deposition of silicon, electroplating solution 310 comprises silicon ions (provided by a high-capacity precursor), and these silicon ions migrate to the working electrode where the silicon ions combine with electrons resulting in the electrochemical formation of silicon structures.

In some examples, the working electrode comprises or is formed from titanium (Ti), platinum (Pt), nickel (Ni), copper (Cu), stainless steel, silicon (Si) wafers glassy carbon (glassy-C), or other metallic or semiconducting substrates. Various characteristics of the working electrode influence the properties of deposited structures. Some of these characteristics are surface area, surface structure, composition, conductivity, and crystallographic orientation. For example, a silicon wafer having <111> crystal orientation, used as the working electrode, produces different types of deposited structures than a silicon wafer having <100> crystal orientation. Furthermore, using a small platinum wire as a working electrode while applying high electrical potential results in precipitation of deposited structures right in the electroplating solution, rather than deposition on the working electrode. The deposition is diffusion and surface limited. On the other hand, increasing the size of the working electrode and/or decreasing the potential shifts this precipitation in the electroplating solution to the deposition on the surface of the working electrode. A specific example of the working electrode includes a polished titanium plate or a stainless steel plate. However, other examples are also within the scope. In some examples, a counter electrode comprises or is formed from glassy carbon (glassy-C), platinum (Pt), gold (Au), or silicon (Si). In general, any inert conductive materials are suitable for a counter electrode, e.g., conductive materials that are not susceptible to electrochemical reactions with components of the electroplating solution. In some examples, the counter electrode has a larger size than that of the working electrode.

The power source is configured to apply an electric potential between the working electrode and the counter electrode. In some examples, the applied electric potential, (from the perspective of the working electrode) is between −0.5V to −10V or, more specifically, between −1V and −5V. As noted above, a lower electric potential (based on the absolute value) may be used for depositing structures on the surface of the working electrode. A higher electric potential (based on the absolute value) may be used for precipitating structures in the electroplating solution. In some examples, the potential is chosen based on a stable window of all chemicals in the electroplating solution.

In some examples, deposition system 300 comprises a heater, for maintaining the temperature of the electroplating solution at between 15° C. and 200° C. For example, the electroplating solution may be maintained at a room temperature of 15° C.-25° C. In some examples, the deposition is performed at a higher temperature than the room temperature, e.g., at 40° C.-60° C. For example, an electroplating solution comprising a mineral oil may be used for the above-the-room-temperature processes. When the electroplating bath is sealed, a temperature of up to 200° C. may be used. In general, a higher plating current may be higher at a higher temperature due to higher ion mobility and faster deposition reactions. However, the increase in temperature may also trigger various side reactions, such as the decomposition of solvents and/or supporting electrolyte salts. As such, low-temperature processes do not exceed 200° C.

In some examples, deposition system 300 comprises an agitator to ensure uniformity of the electroplating solution throughout the entire volume of the electroplating bath. Some examples of agitators include but are not limited to a propeller, ultrasonic agitator, and the like. An agitator helps the supply of fresh ions to the working electrode as ions are being consumed to form deposited structures.

In some examples, deposition system 300 comprises a system controller, controlling the operation of various components of system 300, such as the operation of the power source, agitator, heater, and the like. Furthermore, deposition system 300 may comprise various sensors, which provide output to the system controller. In some examples, these sensors are configured to capture various characteristics of the electroplating solution, e.g., the solution temperature, the solution conductivity, the concentration of various components, and the like.

Solution 310 is provided inside electrochemical bath 302 with working electrode 304 at least partially submerged into solution 310. In this example, solution 310 comprises base solvent 312, high-capacity material precursor 314, and polymer material 316. High-capacity material precursor 314 and polymer material 316 are both dissolved in solution 310. Polymer material 316 is initially suspended in solution 310 as, e.g., is schematically shown in FIG. 3A. Once the voltage is applied to working electrode 304 (e.g., between working electrode 304 and a reference electrode, not shown), high-capacity material precursor 314 decomposes on the surface of working electrode 304 and starts forming active electrode material structures 110 as, e.g., is schematically shown in FIG. 3B. It should be noted that polymer material 316 does not directly participate in an electrochemical deposition. Instead, polymer material 316 adsorbs on active electrode material structures 110, while these active electrode material structures 110 are being formed, and form polymer structures 120 as, e.g., is schematically shown in FIG. 3C. Because the electrochemical deposition of active electrode material structures 110 and the adsorption of polymer structures 120 overlaps in time, at least some polymer structures 120 are incorporated into active electrode material structures 110. More specifically, at least a portion of polymer structures 120 at least partially protrudes into some of active electrode material structures 110 thereby forming composite battery electrode structures 100. The level of this incorporation depends on the rate and duration of the electrochemical deposition and the polymer adsorption, both of which can be controlled using, e.g., the voltage applied to working electrode 304, the temperature of solution 310, the composition of solution 310, and other like parameters. With the further deposition of active electrode material structures 110, composite battery electrode structures 100 eventually detach from working electrode 304 and are removed from solution 310 as, e.g., is schematically shown in FIG. 3D. Examples of the polymer material for polymer structures 120 include any solvable polymers, such as poly(acrylic acid) (PAA), polyvinylalcohol (PVA), polyvinylidene difluoride (PVDF), carboxymethyl cellulose (CMC), polyacrylonitrile (PAN), polypyrrole (PPy), and pyrene-polyacrylic acid (PR-PAA).

In some examples, silicon tetrachloride ($SiCl_4$) is used as a high-capacity material precursor. Other examples include but are not limited to silicon tetrabromide ($SiBr_4$), silicon tetraiodide ($SiI_4$), trichlorosilane ($HSiCl_3$), and dichlorosilane ($H_2SiCl_2$), tetraethyl orthosilicate ($Si(OC_2H_5)_4$), methyltrichlorosilane ($CH_3SiCl_3$), germanium tetrachloride ($GeCl_4$), and tin tetrachloride ($SnCl_4$). For example, 6 wt % of silicon tetrachloride ($SiCl_4$) and 1 wt % polyacrylic acid (PAA) are dissolved as in tetrahydrofuran (THF). Polyacrylic acid (PAA) is an example of a polymer precursor. Other examples are listed above. THF is an example of a base solvent. Other examples include but are not limited to acetonitrile, propylene carbonate (PC), diglyme, monoglyme, and tetraglyme.

In some examples, the process proceeds with adding 20% by weight of sodium naphthalenide ($C_{10}H_7Na$) to the solution. Sodium naphthalenide is an example of a reducing agent. Other examples include but are not limited to sodium metal ($Na^0$), lithium metal ($Li^0$), potassium metal ($K^0$), and lithium biphenyl ($C_{12}H_9Li$). The amount of reducing agent may be from 0.1% by weight to 50% by weight, depending on the reaction stoichiometry.

In some examples, the solution is sealed during this reduction reaction/operation. The solution may be continuously agitated, e.g., by stirring, sonication, or ball milling. The temperature of the solution during this operation may be controlled, e.g., between the ambient temperature (20-25° C.) and 80° C. The pressure inside the sealed reaction chamber may be from 1 atm to 10 atm.

In some examples, composite battery electrode structures 100, which are formed during this reduction of the high-capacity material precursor and the simultaneous adsorption of the polymer precursor, are harvested by filtration or centrifuge. Composite battery electrode structures 100 are cleaned sequentially, e.g., using a series of solvents such as toluene, benzene, and alcohols.

Examples of Simultaneous Synthesis of High Capacity Structures and Polymer Structures In some examples, a solution used to form composite battery electrode structures comprises monomer precursors (rather than dissolved polymer materials). In these examples, the polymerization and crosslinking of the monomer occur at the same time with the synthesis of active electrode material structures. Furthermore, in these examples, the relative ratio of the active electrode material structures and the polymer structures in the resulting composite battery electrode structures can be controlled by using different high-capacity precursors and monomers (e.g., types of materials/compositions), concentrations of these components, and other like factors. It should be noted that the polymers formed in this process may have the following properties, e.g., the monomers used to form polymers may be soluble in an electrolyte solution, while the resulting polymer may not be soluble. In some examples, polymerization can be initiated by a reductive reaction. For example, a reductive reaction may be initiated by a reducing agent, such as sodium metal, lithium metal, potassium metal, and lithium biphenyl. In another example, a reductive reaction may be initiated by a Lewis acid, such as aluminum chloride ($AlCl_3$), silicon tetrachloride ($SiCl_4$), and/or titanium tetrachloride ($TiCl_4$).

In some examples, silicon tetrachloride ($SiCl_4$) is used as a high-capacity material precursor. Other examples include but are not limited to silicon tetrachloride ($SiCl_4$), silicon tetrabromide ($SiBr_4$), silicon tetraiodide ($SiI_4$), trichlorosilane ($HSiCl_3$), dichlorosilane ($H_2SiCl_2$), tetraethyl orthosilicate ($Si(OC_2H_5)_4$), methyltrichlorosilane ($CH_3SiCl_3$), germanium tetrachloride ($GeCl_4$), and tin tetrachloride ($SnCl_4$). For example, 6 wt % of silicon tetrachloride ($SiCl_4$) and 1 wt % acrylic acid are dissolved as in tetrahydrofuran (THF). Acrylic acid is an example of a polymer precursor and is a monomer of polyacrylic acid (PAA). Other examples include but are not limited to vinyl acetate, 2,5-dibromo-3, 4-ethylenedioxythiophene, 2,5-dichloro-3,4-ethylenedioxythiophene, aniline, acrylonitrile, styrene, ethylene oxide, butadiene, pyrrole, glucose, and methyl methacrylate. THF is an example of a base solvent. Other examples include but are not limited to acetonitrile, propylene carbonate (PC), diglyme, monoglyme, and tetraglyme.

In some examples, the process proceeds with adding 20 wt % sodium naphthalenide to the solution. Sodium naphthalenide is an example of a reducing agent. Other examples include but are not limited to sodium metal, lithium metal, potassium metal, and lithium biphenyl. The amount of reducing agent may be from 0.1 wt % to 50 wt %, depending on the reaction stoichiometry.

In some examples, the solution is sealed during this reduction reaction/operation. The solution may be continuously agitated, e.g., by stirring, sonication, or ball milling. The temperature of the solution during this operation may be controlled, e.g., between the ambient temperature (20-25° C.) and 100° C. The pressure inside the sealed reaction chamber may be from 1 atm to 10 atm.

In some examples, the polymer structures are electrochemically polymerized from monomers. For example, a polymer (formed inside silicon structures) can be obtained by blending the monomers in the electrodeposition solution of silicon structures as described above. Simultaneous deposition of poly(3,4-ethylenedioxythiophene) (PEDOT) polymer and silicon was performed to produce the desired structure described in FIG. 1.

In some examples, composite battery electrode structures, which are formed during this reduction of the high-capacity material precursor and the simultaneous adsorption of the polymer precursor, are harvested by filtration or centrifuge. The composite battery electrode structures are cleaned sequentially, e.g., using a series of solvents such as toluene, benzene, and alcohols.

Figure 4A:
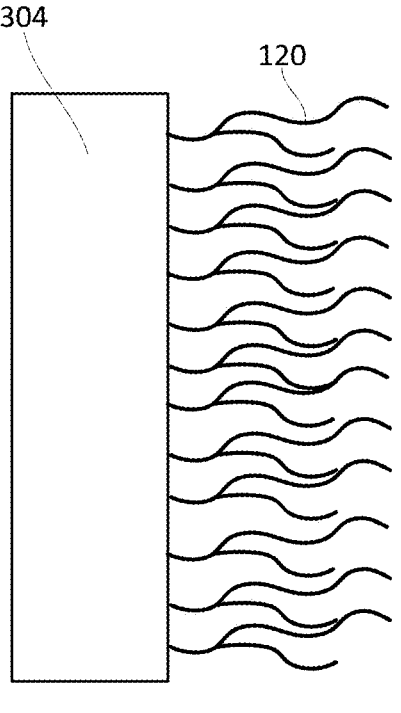
FIG. 4A-4D are schematic illustrations of different stages during low-temperature deposition of composite battery electrode structures, in accordance with additional examples.
Figure 4B:
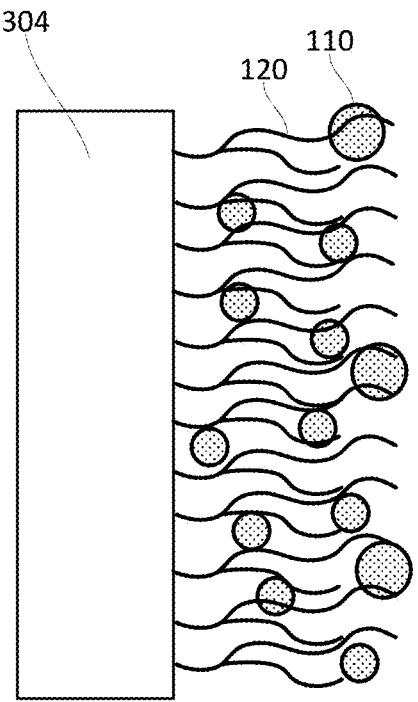
Figure 4C:
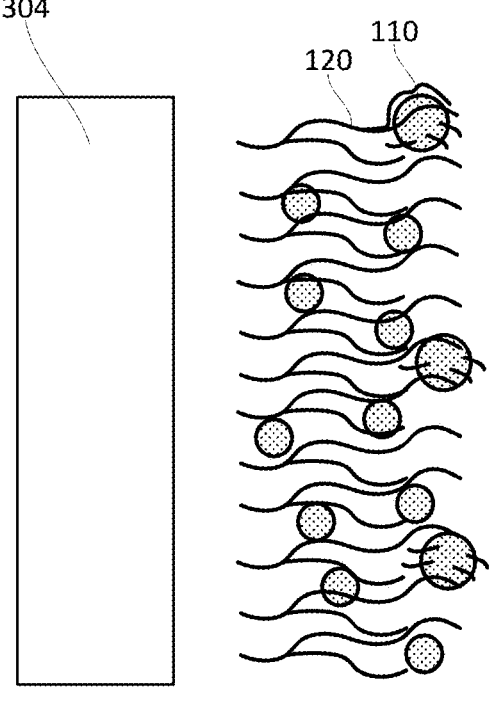
Figure 4D:
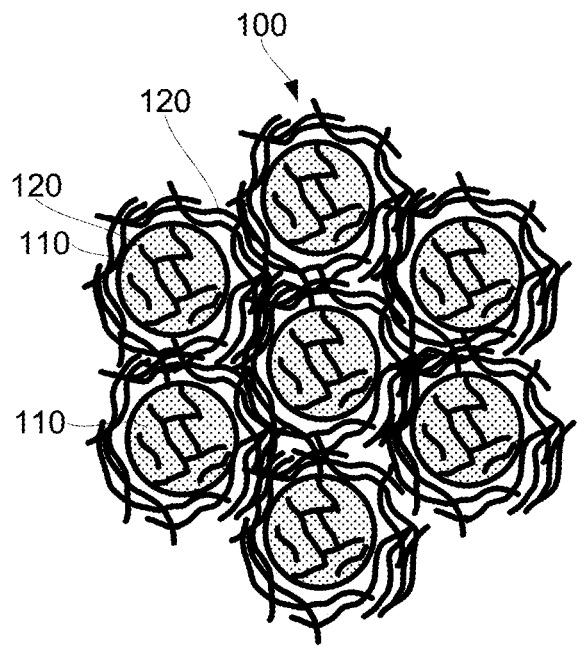

Examples of In-Situ Growth of Electrode Materials on Conductive Polymer Surfaces In some examples, polymer structures 120 are conductive and electrically coupled to a working electrode 304 as, e.g., is schematically shown in FIG. 4A. In these examples, polymer structures 120 function similarly to working electrode 304, and active electrode material structures 110 can electrochemically deposit right on the surface of polymer structures 120 as, e.g., is schematically shown in FIG. 4B. As such, active electrode material structures 110 are grown directly inside a polymer matrix formed by polymer structures 120. This polymer matrix is collected as the final product together with the deposited active electrode material structures 110 as, e.g., is schematically shown in FIGS. 4C and 4D.

The relative ratio of active electrode material structures 110 and polymer structures 120 is controlled by the total charge input, which determines the amount of active electrode material structures 110 that is electrochemically deposited.

In some examples, conductive polymer structures 120 also coat active electrode material structures 110 and provide the facile electric contact among active electrode material structures 110 and also between some active electrode material structures 110 and a correct collector. Even after pulverization, the smaller particles will still not lose electrical contact.

Some examples of the suitable conductive polymer structures 120 include but are not limited to polyanilines (PANI), polypyrrole (PPy), and poly(3,4-ethylenedioxythiophene) polystyrene sulfonate (PEDOT:PSS).

In some examples, the process starts with preparing a working electrode with a conductive polymer coating. For example, a conductive polymer is dissolved in an appropriate solvent, and drop cast onto the metal electrode to achieve a thick coating. A certain degree of porosity (20~80%) is maintained. Various examples of suitable conductive polymers are listed above.

The process continues with preparing an electrochemical plating solution. For example, 1M silicon tetrachloride ($SiCl_4$) and 1M tetrabutylammonium chloride (TBACl) are dissolved in tetrahydrofuran (THF). Silicon tetrachloride ($SiCl_4$) is used as a high-capacity material precursor. Other examples include but are not limited to silicon tetrabromide ($SiBr_4$), silicon tetraiodide ($SiI_4$), trichlorosilane ($HSiCl_3$), dichlorosilane ($H_2SiCl_2$), tetraethyl orthosilicate ($Si(OC_2H_5)_4$), methyltrichlorosilane ($CH_3SiCl_3$), germanium tetrachloride ($GeCl_4$), and tin tetrachloride ($SnCl_4$). THF is an example of a base solvent. Other examples include but are not limited to acetonitrile, propylene carbonate (PC), diglyme, monoglyme, and tetraglyme.

The process continues with assembling an electrolyzer. For example, the working electrode with a conductive-polymer coating is used as a cathode, while a graphite electrode is used as an anode. The plating solution described above is added to a bath between these electrodes.

The deposition involves applying a voltage ranging from 2.5V to 6V between the electrodes of the electrolyzer. The silicon particles are deposited inside the conductive polymer matrix. The amount of silicon deposited can be controlled by the total charge input. The relative ratio between the polymer and silicon can be controlled by the mass loading per unit area of the two. After the desired amount of silicon is deposited, the mixture of silicon and polymer can be mechanically scraped off the metal electrode. With sequential cleaning, drying, and secondary particle formation, the final product can be harvested.

Examples of Electrochemical Cells/Applications

Figure 5:
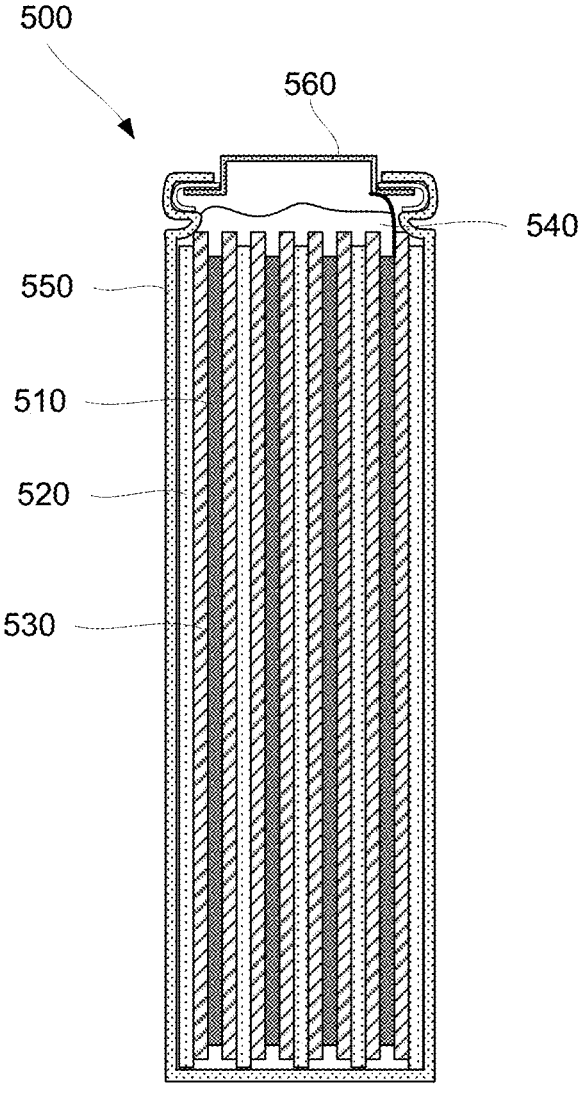
FIG. 5 is a schematic cross-sectional view of a battery cell, in accordance with additional examples.

FIG. 5 is a schematic illustration of electrochemical cell 500, comprising positive electrode 510, negative electrode 520, and separator 530 arranged in a stack, wound jelly-roll, or any form. Various examples of electrodes are described above. For example, negative electrode 520 may be fabricated with composite battery electrode structures 100 described above. More specifically, composite battery electrode structures 100 can be mixed into a slurry together with a polymer binder. The slurry is then coated onto a current collector (e.g., metal foil) and dried to form a negative active material layer. Negative electrode 520 may include two negative active material layers, e.g., one on each side of the current collector.

Separator 530 is disposed between positive electrode 510 and negative electrode 520 to prevent direct contact between positive electrode 510 and negative electrode 520 yet allows ionic communication between these electrodes. Specifically, separator 530 may include pores allowing ions to pass. Electrochemical cell 500 also includes electrolyte 540, which operates as a carrier of ions between positive electrode 510 and negative electrode 520 during the cycling of electrochemical cell 500. Positive electrode 510, negative electrode 520, separator 530, and electrolyte 540 are enclosed by case 550 and lid 560. In some examples, case 550 and/or lid 560 may operate as terminals of electrochemical cell 500, in which case current collectors of positive electrode 510 and/or negative electrode 520 may be connected to case 550 and/or lid 560. Composite battery electrode structures 100 described above may be used as a part of negative electrode 520.

Experimental Results

Figure 6:
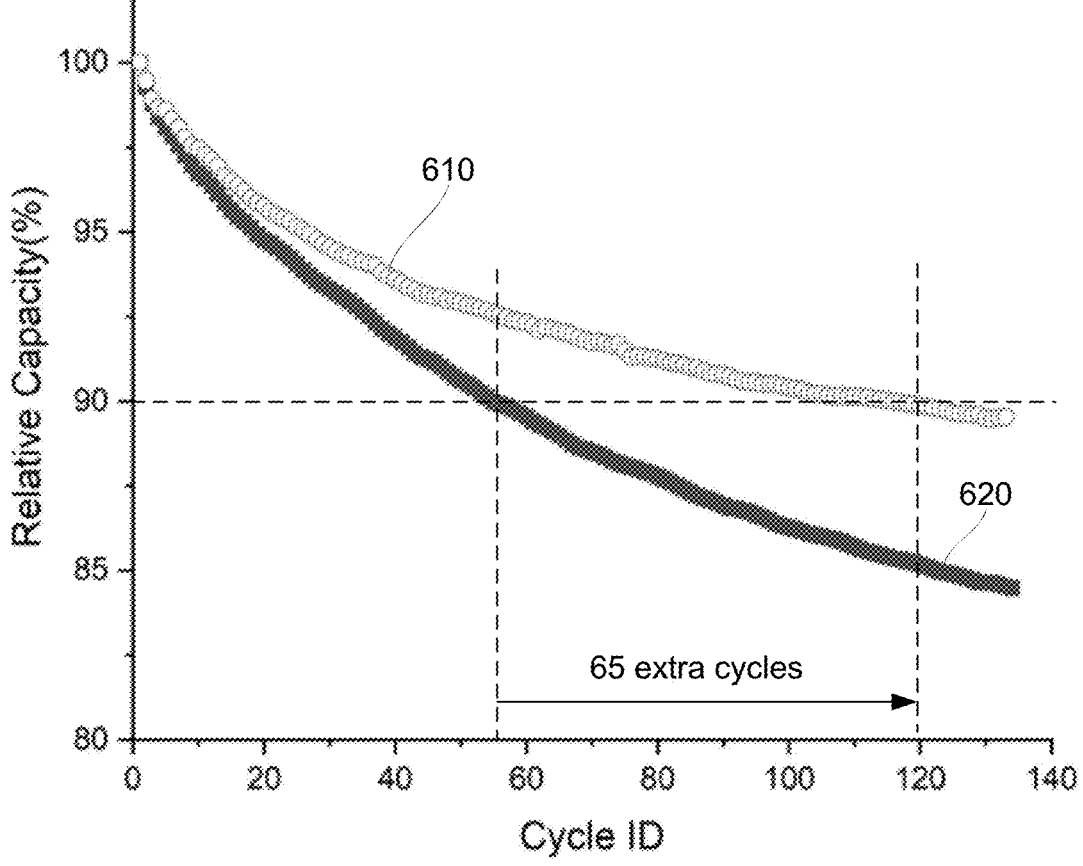
FIG. 6 illustrates two capacity retention (cycle life) plots for reference and test battery cells that are fabricated with composite electrode structures (test cells) and with conventional active material (reference cells).

FIG. 6 illustrates experimental results comparing the cycling performance of battery cells fabricated with composite electrode structures (line 610) and with a conventional active material (line 620). The composite electrode structure (line 610) was synthesized from the simultaneous electrochemical reduction of silicon from a precursor and electro-polymerization of poly(3,4-ethylenedioxythiophene) from corresponding monomers. The conventional active material (line 620) was commercial silicon powder without any internal polymer structures. Both types of materials were blended with graphite, carbon black, and polymer binder at the same weight ratio to form the slurry that was used to prepare corresponding negative electrodes. NMC622 material was used to prepare positive electrodes to form a full battery.

The battery cells with the composite electrode structures (line 610) demonstrated much better performance than the reference battery cells with the conventional active material (line 620) while being cycled at the same cycling rate of 1C. For example, the battery cells with the composite electrode structures (line 610) maintain their relative capacity of 90+% (to the initial capacity) through 120 cycles, while the reference battery cells with the conventional active material (line 620) maintained this level for only about 55 cycles (reflecting an almost twice shorter cycle life for these cycling/capacity retection conditions).

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered illustrative and not restrictive.

What is claimed is:

1. A method of fabricating composite battery electrode structures, the method comprising:
   synthesizing active electrode material structures using one or more low-temperature techniques selected from the group consisting of electrochemical deposition, solvent-thermal synthesis, and direct chemical reduction, wherein:
   the composite battery electrode structures comprise the active electrode material structures and polymer structures, and
   at least a first portion of the polymer structures is at least partially incorporated into a second portion of the active electrode material structures while synthesizing the active electrode material structures such that at least the first portion of the polymer structures partially protrudes into and is at least partially surrounded by at least a second portion of the active electrode material structures.

2. The method of claim 1, further comprising forming the polymer structures simultaneously with electrochemically depositing the active electrode material structures.

3. The method of claim 2, wherein forming the polymer structures comprises adsorbing a polymer material on the active electrode material structures while the active electrode material structures are being electrochemically deposited.

4. The method of claim 3, wherein the polymer material is dissolved in a solution comprising one or more components used for electrochemically depositing the active electrode material structures.

5. The method of claim 3, wherein the polymer material comprises at least one of poly (acrylic acid) (PAA), polyvinylalcohol (PVA), polyvinylidene difluoride (PVDF), carboxymethyl cellulose (CMC), polyacrylonitrile (PAN), polypyrrole (PPy), or pyrene-polyacrylic acid (PR-PAA).

6. The method of claim 2, wherein forming the polymer structures comprises polymerizing a monomer material while synthesizing the active electrode material structures.

7. The method of claim 6, wherein the monomer material comprises at least one of 2,5-dibromo-3,4-ethylenedioxy-thiophene monomer, 2,5-dichloro-3,4-ethylenedioxythio-phene monomer, aniline monomer, acrylonitrile monomer, styrene monomer, ethylene oxide monomer, butadiene monomer, pyrrole monomer, and glucose monomer.

8. The method of claim 6, wherein the monomer material comprises at least one of polyacrylic acid (PAA) monomer, vinyl acetate monomer, and methyl methacrylate monomer.

9. The method of claim 1, wherein the polymer structures comprise a conductive polymer and are mechanical and electrically coupled to a working electrode used for electrochemically depositing the active electrode material structures such that the active electrode material structures electrochemically deposit on the surface of the polymer structures.

10. The method of claim 9, wherein the conductive polymer comprises one or more of polyaniline (PANI), polypyrrole (PPy), and poly (3,4-ethylenedioxythiophene) polystyrene sulfonate (PEDOT: PSS).

11. The method of claim 10, wherein:

the active electrode material structures comprise silicon, the active electrode material structures are formed using the electrochemical deposition performed in an electrodeposition solution, and the electrodeposition solution comprises one or more silicon tetrachloride (SiCl$_4$), silicon tetrabromide (SiBr$_4$), silicon tetraiodide (SiI$_4$), trichlorosilane (HSiCl$_3$), dichlorosilane (H$_2$SiCl$_2$), tetraethyl orthosilicate (Si (OC$_2$H$_5$) 4), methyltrichlorosilane (CH$_3$SiCl$_3$), germanium tetrachloride (GeCl$_4$), and tin tetrachloride (SnCl$_4$).

12. The method of claim 1, wherein the composite battery electrode structures have a mean particle size of between 5 nanometers and 100 micrometers.

13. The method of claim 1, further comprising, simultaneously with synthesizing the active electrode material structures, forming the polymer structures.

14. The method of claim 1, wherein the active electrode material structures comprise at least one of silicon (Si), germanium (Ge), tin (Sn), aluminum (Al), silicon oxide (SiO$_x$), silicon carbide (SiC), and silicon oxycarbide (SiO$_x$C$_y$).

15. The method of claim 13, wherein:

forming the polymer structures is performed by introducing a reducing agent or a Lewis acid into a base solution, the reducing agent is selected from the group consisting of sodium metal, lithium metal, potassium metal, and lithium biphenyl, and the Lewis acid is selected from the group consisting of aluminum chloride (AlCl$_3$), silicon tetrachloride (SiCl$_4$), and titanium tetrachloride (TiCl$_4$).

16. The method of claim 13, wherein forming the polymer structures is performed in a mixture comprising silicon tetrachloride (SiCl$_4$), polyacrylic acid (PAA), and a base solvent selected from the group consisting of tetrahydrofuran (THF), acetonitrile, propylene carbonate (PC), diglyme, monoglyme, and tetraglyme.

17. The method of claim 16, wherein the base solvent is tetrahydrofuran (THF).

18. The method of claim 1, wherein the active electrode material structures are synthesized using the electrochemical deposition in an electrochemical plating solution comprising silicon tetrachloride (SiCl$_4$), tetrabutylammonium chloride (TBACl), and tetrahydrofuran (THF).

19. The method of claim 1, wherein the active electrode material structures are synthesized using the direct chemical reduction by adding sodium naphthalenide (C$_{10}$H$_7$Na), operable as a reducing agent, to a base solution comprising a high-capacity material precursor.

20. The method of claim 19, wherein the high-capacity material precursor is selected from the group consisting of silicon tetrachloride (SiCl$_4$), silicon tetrabromide (SiBr$_4$), silicon tetraiodide (SiI$_4$), trichlorosilane (HSiCl$_3$), dichlorosilane (H$_2$SiCl$_2$), tetraethyl orthosilicate (Si(OC$_2$H$_5$)$_4$), methyltrichlorosilane (CH$_3$SiCl$_3$), germanium tetrachloride (GeCl$_4$), and tin tetrachloride (SnCl$_4$).

* * * * *